(12) United States Patent
Bullock et al.

(10) Patent No.: US 7,306,863 B2
(45) Date of Patent: Dec. 11, 2007

(54) REPLACEABLE FUEL CELL APPARATUS HAVING INFORMATION STORAGE DEVICE

(75) Inventors: Michael L. Bullock, San Diego, CA (US); Winthrop D. Childers, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 532 days.

(21) Appl. No.: 10/957,468

(22) Filed: Oct. 1, 2004

(65) Prior Publication Data

US 2005/0084722 A1    Apr. 21, 2005

Related U.S. Application Data

(62) Division of application No. 10/000,248, filed on Oct. 29, 2001, now Pat. No. 6,828,049.

(51) Int. Cl.
    H01M 8/04    (2006.01)
(52) U.S. Cl. .............. 429/22; 429/23; 429/34; 220/4.12
(58) Field of Classification Search ............... None
    See application file for complete search history.

(56) References Cited

U.S. PATENT DOCUMENTS

| | | | |
|---|---|---|---|
| 3,450,500 A | 6/1969 | Setzer et al. | |
| 4,088,864 A | 5/1978 | Theeuwes et al. | |
| 4,193,978 A | 3/1980 | Muller et al. | |
| 4,493,878 A | 1/1985 | Horiba et al. | |
| 5,432,023 A | 7/1995 | Yamada et al. | |
| 5,504,471 A | 4/1996 | Lund | |
| 5,522,512 A | 6/1996 | Archer et al. | |
| 5,644,342 A | 7/1997 | Argyres | |
| 5,673,939 A | 10/1997 | Bees et al. | |
| 5,789,093 A | 8/1998 | Malhi | |
| 5,797,269 A | 8/1998 | Nishimura et al. | |
| 5,812,156 A | 9/1998 | Bullock et al. | |
| 5,894,801 A | 4/1999 | Ackley | |
| 5,962,155 A | 10/1999 | Kuranaka et al. | |
| 5,976,725 A | 11/1999 | Gamo et al. | |
| 6,007,186 A | 12/1999 | Erni | |
| 6,015,209 A | 1/2000 | Barinaga et al. | |
| 6,039,430 A | 3/2000 | Helterline et al. | |
| 6,054,228 A | 4/2000 | Cisar et al. | |
| 6,057,051 A | 5/2000 | Uchida et al. | |
| 6,089,687 A | 7/2000 | Helterline | |
| 6,113,208 A | 9/2000 | Benjamin et al. | |
| 6,129,861 A | 10/2000 | Meusinger et al. | |
| 6,198,250 B1 | 3/2001 | Gartstein et al. | |
| 6,268,077 B1 | 7/2001 | Kelly et al. | |
| 6,294,276 B1 | 9/2001 | Ogino | |
| 6,452,133 B1 | 9/2002 | Geerke et al. | |

(Continued)

FOREIGN PATENT DOCUMENTS

EP    0234779 A    9/1987

(Continued)

*Primary Examiner*—John S. Maples

(57) ABSTRACT

A fuel cell apparatus in accordance with a present invention includes an information storage device. A method of operating a host device in accordance with a present invention includes the step(s) of writing data to, and/or accessing data on, a fuel cell apparatus information storage device. A system in accordance with a present invention includes a host device and a fuel cell apparatus with an information storage device.

14 Claims, 10 Drawing Sheets

U.S. PATENT DOCUMENTS

| | | |
|---|---|---|
| 6,534,033 B1 | 3/2003 | Amendola et al. |
| 6,713,201 B2 | 3/2004 | Bullock et al. |
| 6,724,194 B1 | 4/2004 | Barton |
| 6,828,049 B2 | 12/2004 | Bullock et al. |
| 6,887,596 B2 | 5/2005 | Leban |
| 2001/0045364 A1 | 11/2001 | Hockaday et al. |
| 2001/0052433 A1 | 12/2001 | Harris et al. |
| 2002/0018925 A1 | 2/2002 | Merin Celemin et al. |
| 2002/0127447 A1 | 9/2002 | Edlund et al. |
| 2002/0154915 A1 | 10/2002 | Bullock et al. |
| 2003/0008186 A1 | 1/2003 | Dickman et al. |
| 2003/0022041 A1 | 1/2003 | Barton et al. |
| 2003/0022042 A1 | 1/2003 | Wells et al. |
| 2003/0051785 A1 | 3/2003 | Gauthier et al. |
| 2003/0082427 A1 | 5/2003 | Prasad et al. |
| 2003/0124408 A1 | 7/2003 | Hojo et al. |
| 2003/0129464 A1 | 7/2003 | Becerra et al. |
| 2003/0136453 A1 | 7/2003 | Johnson |
| 2003/0138676 A1 | 7/2003 | Leban |
| 2003/0138679 A1 | 7/2003 | Prasad et al. |
| 2004/0009121 A1 | 1/2004 | Jensen et al. |
| 2004/0076861 A1 | 4/2004 | Mann et al. |
| 2005/0079128 A1 | 4/2005 | de Vos et al. |

FOREIGN PATENT DOCUMENTS

| | | |
|---|---|---|
| EP | 0 940 260 | 9/1999 |
| EP | 1 253 522 | 10/2002 |
| EP | 1 353 393 | 10/2002 |
| EP | 1 306 918 | 5/2003 |
| EP | 1396472 A2 | 3/2004 |
| GB | 1568374 A | 5/1980 |
| GB | 2283235 A | 5/1995 |
| JP | 09-213359 A | 8/1997 |
| JP | 10-321248 | 12/1998 |
| JP | 2001-185184 A | 7/2001 |
| JP | 2001-295996 A | 10/2001 |
| JP | 2001-313047 A | 11/2001 |
| JP | 2003-045468 A | 2/2003 |
| WO | WO-00/24076 A | 10/1998 |
| WO | WO 00/35032 | 6/2000 |
| WO | WO01/79012 | 10/2001 |
| WO | WO-03/043112 A | 5/2003 |
| WO | WO-2004/001883 A2 | 12/2003 |

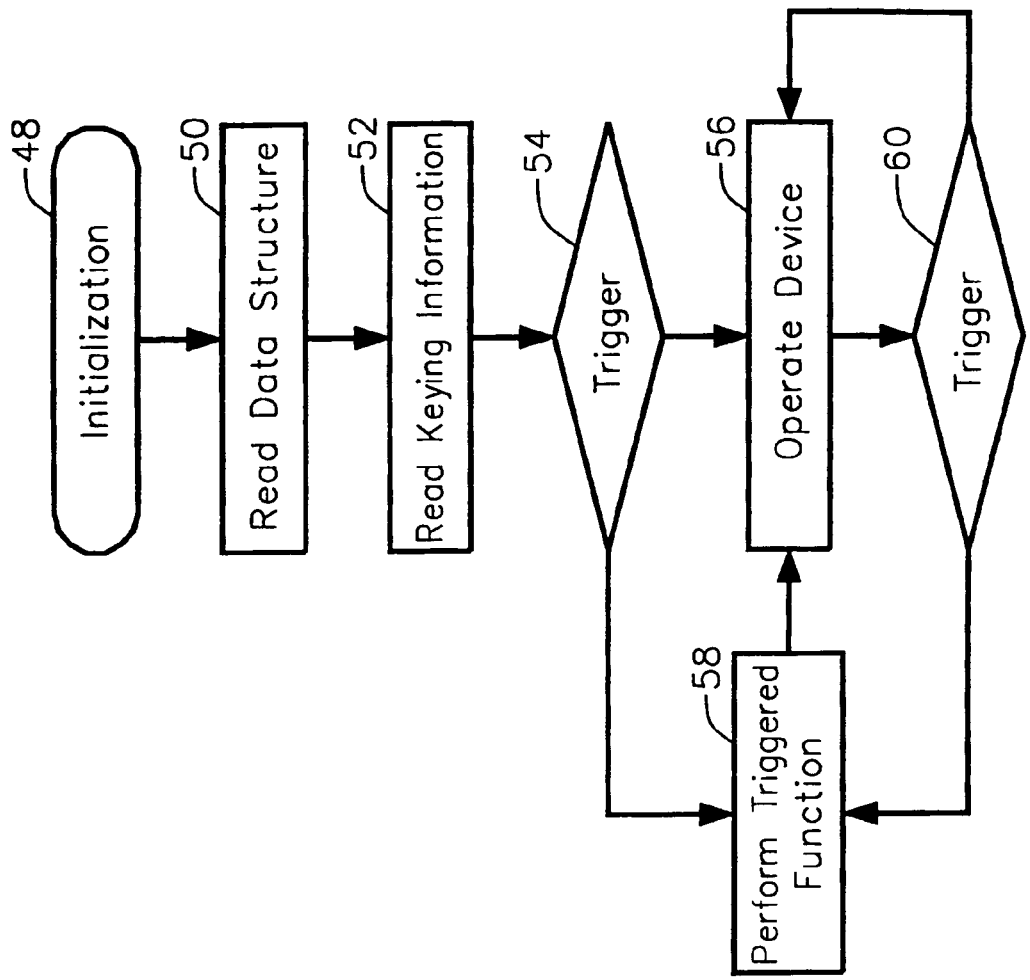
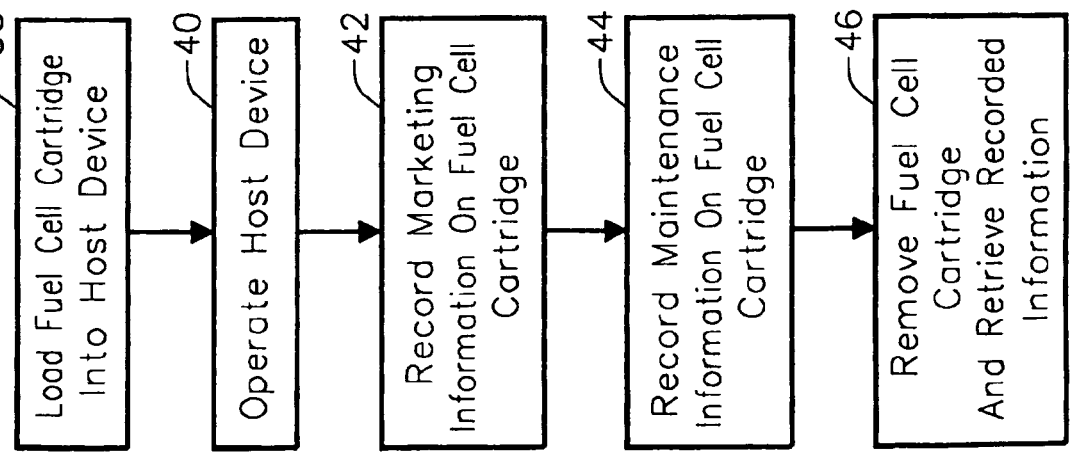

REPLACEABLE FUEL CELL APPARATUS HAVING INFORMATION STORAGE DEVICE

CROSS REFERENCE TO RELATED APPLICATION(S)

This application is a divisional of application Ser. No. 10/000,248, filed Oct. 29, 2001, now U.S. Pat. No. 6,828,049 which is hereby incorporated by reference herein.

BACKGROUND OF THE INVENTIONS

1. Field of the Inventions

The present inventions are related to fuel cells and, more specifically, to fuel cell fuel cartridges and self-contained fuel cell devices.

2. Description of the Related Art

A wide variety of portable electronic devices have been introduced over the years. These devices include, but are not limited to, information processing devices such as notebook personal computers ("PCs"), handheld PCs, palmtop PCs and personal digital assistants ("PDAs"), communication devices such as mobile telephones, wireless e-mail appliances and electronic books, video games and other toys, and audio and video devices such as compact disk players and video cameras. Other portable electronic devices include portable test systems, portable projectors, and portable televisions such as portable flat panel televisions. Portable electronic devices are quite convenient in that they may be used and enjoyed without being connected to an electrical outlet.

The conventional source of electrical power for most portable electronic devices has been, and continues to be, batteries. More recently, the use of fuel cells has been proposed because, as compared to batteries, fuel cells tend to have higher energy densities. Fuel cells are also typically able to maintain a specific power output (so long as fuel is continuously supplied) and are not hampered by a charge/discharge cycle.

The inventors herein have determined that conventional fuel cells, especially those used in conjunction with electronic devices, are susceptible to improvement. More specifically, the inventors herein have determined that it would be desirable to provide fuel cell fuel cartridges and self-contained fuel cell devices (collectively referred to herein as "fuel cell apparatus") that are capable of functions in addition to power generation and fuel storage.

SUMMARY OF THE INVENTIONS

A fuel cell apparatus in accordance with a present invention includes an information storage device. Exemplary implementations of the invention include, but are not limited to, fuel cell fuel cartridges and self-contained fuel cell devices. A method of operating a host device in accordance with a present invention includes the step(s) of writing data to, and/or accessing data on, a fuel cell apparatus information storage device. A system in accordance with a present invention includes a host device and a fuel cell apparatus with an information storage device.

The present apparatus and methods provide a number of advantages over conventional apparatus and methods. Most notably, a wide variety of data may be stored on the information storage device, both prior to being connected to the host device and by host device itself during the course of its operation. Such data may, for example, be used by the host device to determine whether the fuel in the fuel cell apparatus is the appropriate type of fuel, how much fuel is within the fuel cell apparatus, and whether the a low fuel threshold has been reached. The information storage device may also be used to store marketing and maintenance information gleaned during operation of the host device. Thus, when a spent fuel cell apparatus is returned to a manufacturer for disposal or recycling, this data can be read and used for the appropriate purpose.

The data stored on the information storage device may also be used to trigger various host device functions. If, for example, the low fuel threshold has been reached for a particular fuel cell apparatus, the host device could automatically decrease power consumption. Data that is not associated with the operation of the host device, such as notifications concerning products, software upgrades, or other advertising materials may also be stored on the information storage device. Here, the host device would read the data and, in response, perform functions such as displaying the information to the user and connecting the host device to a remote device (such as a web server or other remote device) for further transactions regarding the desired products or services.

BRIEF DESCRIPTION OF THE DRAWINGS

Detailed description of preferred embodiments of the inventions will be made with reference to the accompanying drawings.

FIG. 10 is a flow chart in accordance with a preferred embodiment of a present invention.

FIG. 11 is a flow chart in accordance with a preferred embodiment of a present invention.

DETAILED DESCRIPTION OF THE PREFERRED EMBODIMENTS

The following is a detailed description of the best presently known modes of carrying out the inventions. This description is not to be taken in a limiting sense, but is made merely for the purpose of illustrating the general principles of the inventions. It is noted that detailed discussions of fuel cell structures and the internal operating components of portable electronic devices and other host devices not pertinent to the present inventions have been omitted for the sake of simplicity. Additionally, although the exemplary embodiments described below are presented in the context of a PDA, the present inventions are applicable to any host device, including but not limited to any portable electronic device, that is susceptible to use with one or more fuel cells. The present inventions are also applicable to a wide range of fuel cell technologies, including those presently being developed or yet to be developed. Thus, although the exemplary fuel cell apparatus described below are direct alcohol fuel cell apparatus, other types of fuel cell apparatus are equally applicable to the present inventions. For example, where the host device is a portable computer that requires relatively high power, a solid oxide fuel cell apparatus may be employed.

The inventions are also described primarily in the context of replaceable fuel cell fuel cartridges. However, many of the inventions are also applicable to other fuel cell apparatus, such as self-contained fuel cell devices that include both fuel and one or more fuel cells, as is described below with reference to FIG. 12.

Figure 1:
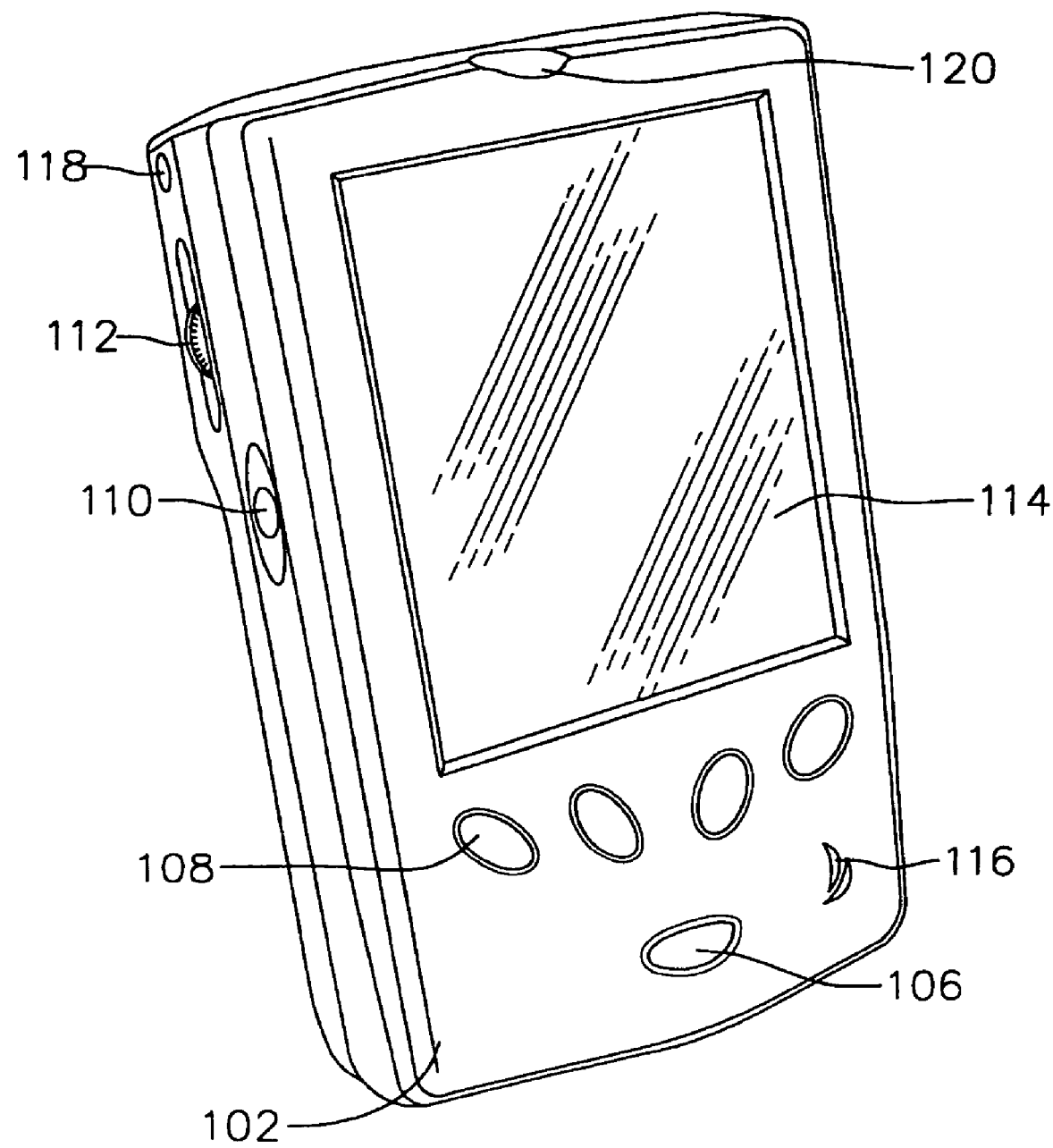
FIG. 1 is a perspective view of a portable electronic device in accordance with a preferred embodiment of a present invention.

The inventor herein has determined that one example of a conventional PDA which could be reconfigured in such a manner that it would embody, incorporate, perform or be used in conjunction with at least some of the present inventions is Hewlett Packard Jornada 520 Series PDA. As illustrated for example in FIGS. 1 and 2, a PDA 100 in accordance with one embodiment of a present invention includes a housing 102 that supports a plurality of function keys 104, such as the exemplary on-off button 106, hot keys 108 that are used to open predetermined applications, record button 110 and action button 112 that is used to scroll or select a highlighted item. The housing 102 also supports a display 114, a speaker 116, a microphone 118, and a notification light 120 that facilitate audible and visible communication between the PDA 100 and the user. In order to allow the exemplary PDA 100 to communicate with other devices, a modem 122 and a port 124, such as serial or USB port, may also be provided. Each of the these devices is preferably connected, either directly or indirectly, to a system controller 126 that may include a processor, memory, associated software and/or any other device that is used to control the operations of the PDA such that the PDA perform various functions. Such functions include conventional PDA functions and the functions (discussed below) associated with the present inventions.

The exemplary PDA 100 is powered by a fuel cell system that includes a fuel cell stack 128 consisting of one or more cells 130 and a removable fuel cartridge 132. Although the present inventions are not limited to any particular type of fuel cell system, the exemplary system is a direct methanol proton exchange membrane (PEM) fuel cell system. PEM fuel cells are particularly advantageous because of their relatively low operating temperatures and non-corrosive electrolyte. As is known to those of skill in the art, each cell 130 in the PEM fuel cell 128 stack includes an anode 134 and a cathode 136 separated by a PEM 138. Fuel, such as a methanol and water mixture, is supplied to the anode 134 and oxygen supplied to the cathode 136. The fuel is electrochemically oxidized at an anode catalyst, thereby producing protons that migrate across the conducting PEM 138 and react with the oxygen at a cathode catalyst to produce a bi-product (water in the exemplary embodiment).

The individual cells 130 in the exemplary PDA 100 are stacked in electrical series with bipolar plates therebetween that conduct current between the anode 134 of one cell and the cathode 136 of the adjacent cell. The fuel flows from the cartridge 132, through a manifold, and between the anodes and associated plates in conventional fashion. A suitable vent allows atmospheric air to flow between the cathodes and associated plate in conventional fashion. The stack 128 is connected to various electrical loads such as the display 114 and system controller 126. Bi-products are preferably carried away from the stack 128 by another manifold.

Figure 3:
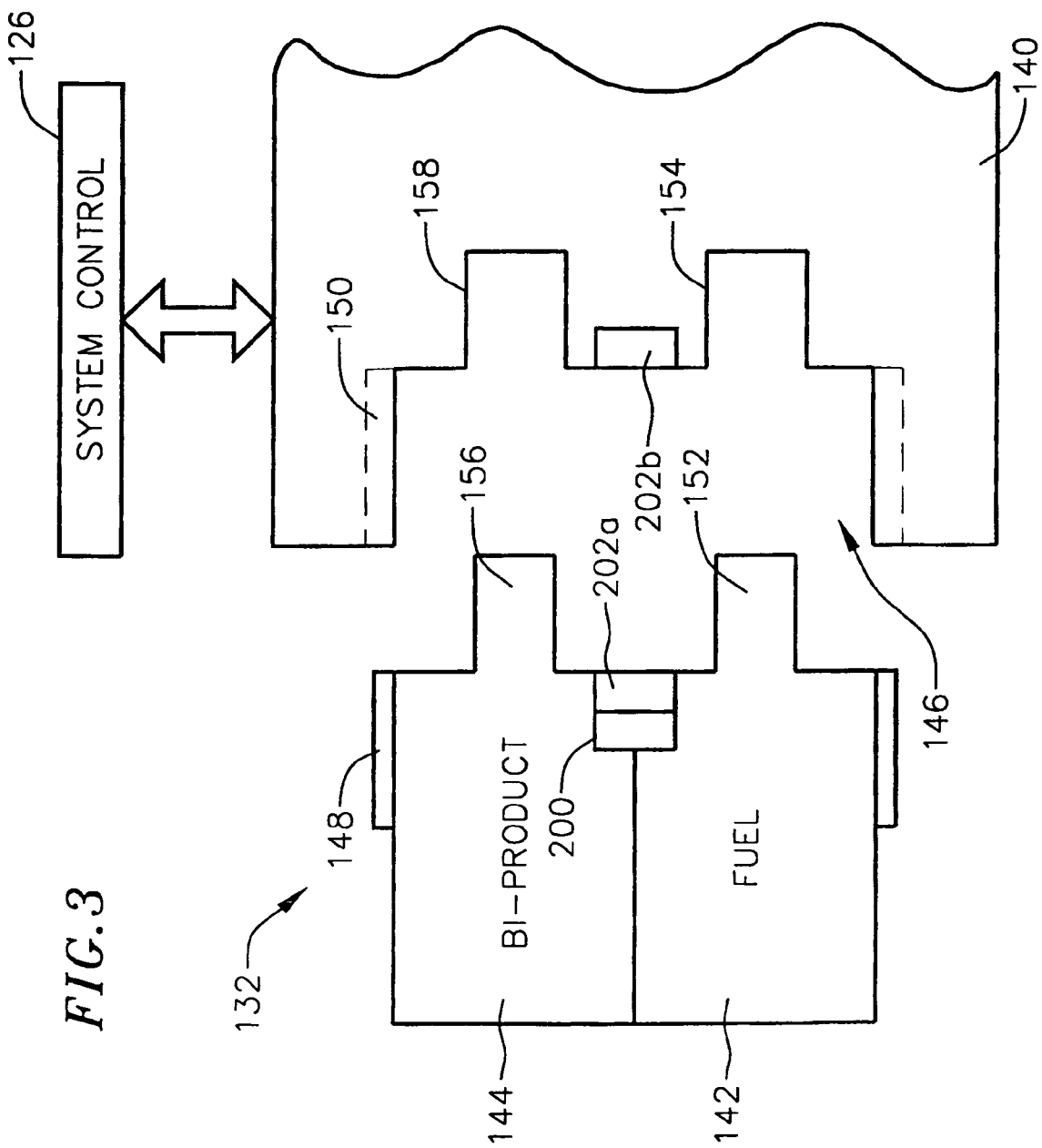
FIG. 3 is a side view showing a fuel cartridge and fuel cell housing in accordance with a preferred embodiment of a present invention.

The exemplary fuel cartridge 132 includes a housing with separate fuel and bi-product reservoirs 142 and 144 and is adapted to mate with a socket 146 in the fuel cell stack housing 140, as illustrated in FIG. 3. The fuel reservoir 142 also preferably includes a suitable device for creating and maintaining fluid pressure, while the bi-product reservoir 144 preferably includes a device for creating a vacuum. With respect to the mechanical connection, the fuel cartridge 132 and housing socket 146 have corresponding shapes and an exemplary rail 148 and slot 150 arrangement or other mechanical keying apparatus. Such an arrangement will preferably prevent the fuel cartridge 132 from being inserted improperly and, in many instances, prevent the wrong type of cartridge from being inserted into a particular socket. The respective positions of the rails 148 and slots 150 may be reversed (i.e. rails on the socket 146 and slots on the cartridge 132), other mechanical keying apparatus may be employed, or the mechanical keying apparatus removed as applications require. A suitable locking device, such as a latch (not shown), may also be provided to hold the fuel cartridge in place. The fluid connection is accomplished by way of a fuel outlet connector 152 on the fuel cartridge 132 that connects to a fuel inlet connector 154 on the housing socket 146, and a bi-product inlet connector 156 on the fuel cartridge that connects to a bi-product outlet connector 158 on the housing socket. Preferably, the connections will occur automatically when the fuel cartridge 132 received by (e.g. inserted into or connected to) the PDA 100 or other host device to connect the cartridge to the stack manifolds.

The size of a fuel cartridge 132 would, of course, vary in accordance with factors such as the size of the host device and the desired amount of fuel. Although the present inventions are not limited to any particular size, the exemplary fuel cartridge 132, which is suitable for use in a PDA, is about 0.8 cm×2 cm×4 cm and carries about 6 milliliter (ml) of fuel. It is contemplated that, depending on the application, the size of the cartridge may be varied to accommodate from less than 1 ml of fuel for a small low power host device to 1 liter (L) or more for a larger high power device such as a portable television being powered by a solid oxide fuel cell apparatus. Of course, these volumes may be increased or decreased as needed.

Although the present inventions are not limited to any particular connector arrangement, the preferred arrangement is a self-sealing inlet/outlet connector arrangement that prevents leakage. With such a self-sealing arrangement, seals will be maintained at the fuel outlet connector 152 on the fuel cartridge 132 and the fuel inlet connector 154 on the housing socket 146 when the two are connected to, and disconnected from, one another as the cartridge is received by, and removed from, the host device. Once the sealed connection is made, fuel will flow from the fuel reservoir to 142 to the manifold. The same type of sealed connection will be formed by the bi-product inlet connector 156 on the fuel cartridge 132 and the bi-product outlet connector 158 on the housing socket 146. Once the sealed connection is made, bi-product will flow from the manifold to the bi-product reservoir 144.

Figure 4:
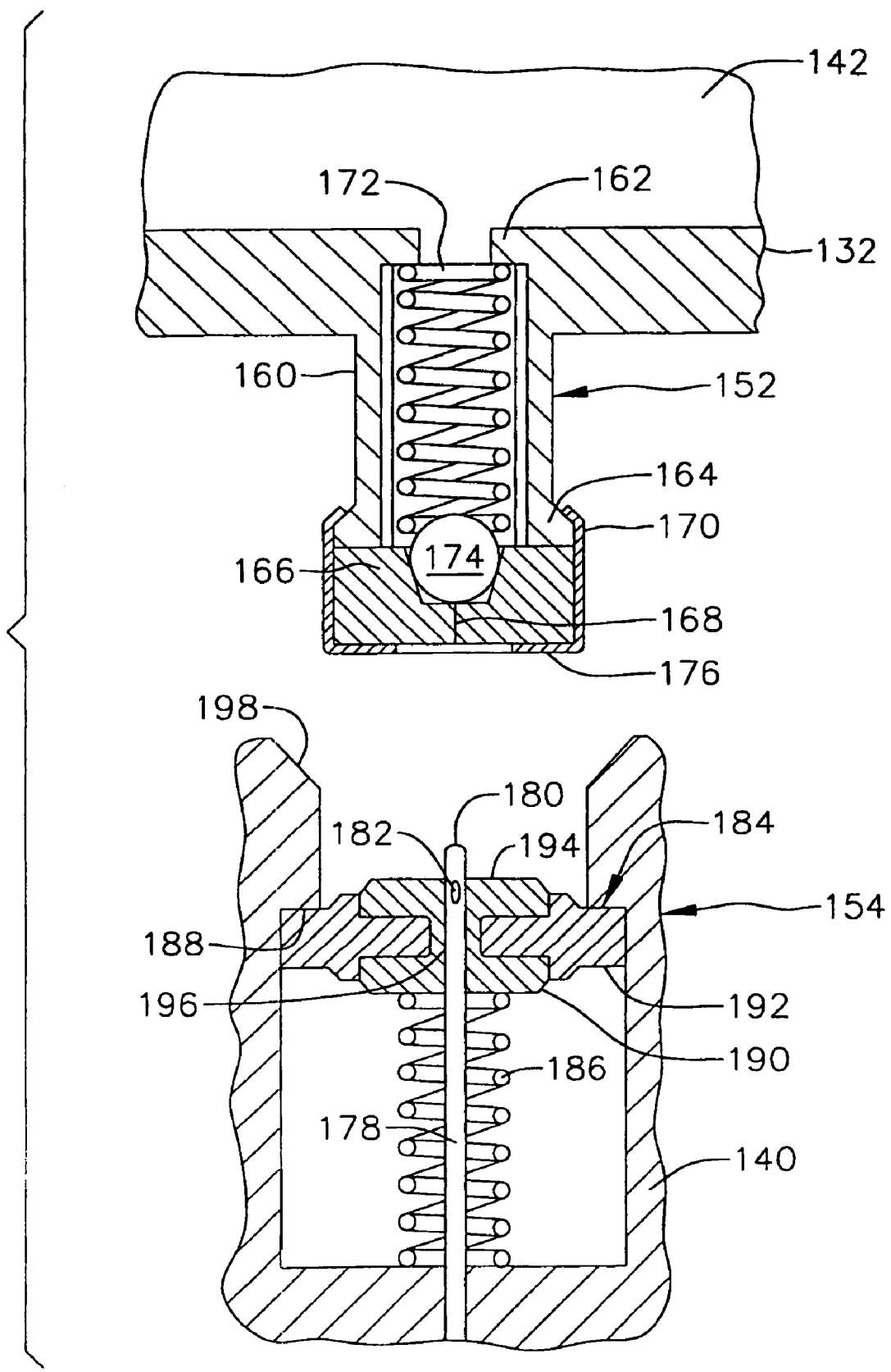
FIG. 4 is a section view of a connector arrangement in accordance with a preferred embodiment of a present invention in a disconnected state.
Figure 5:
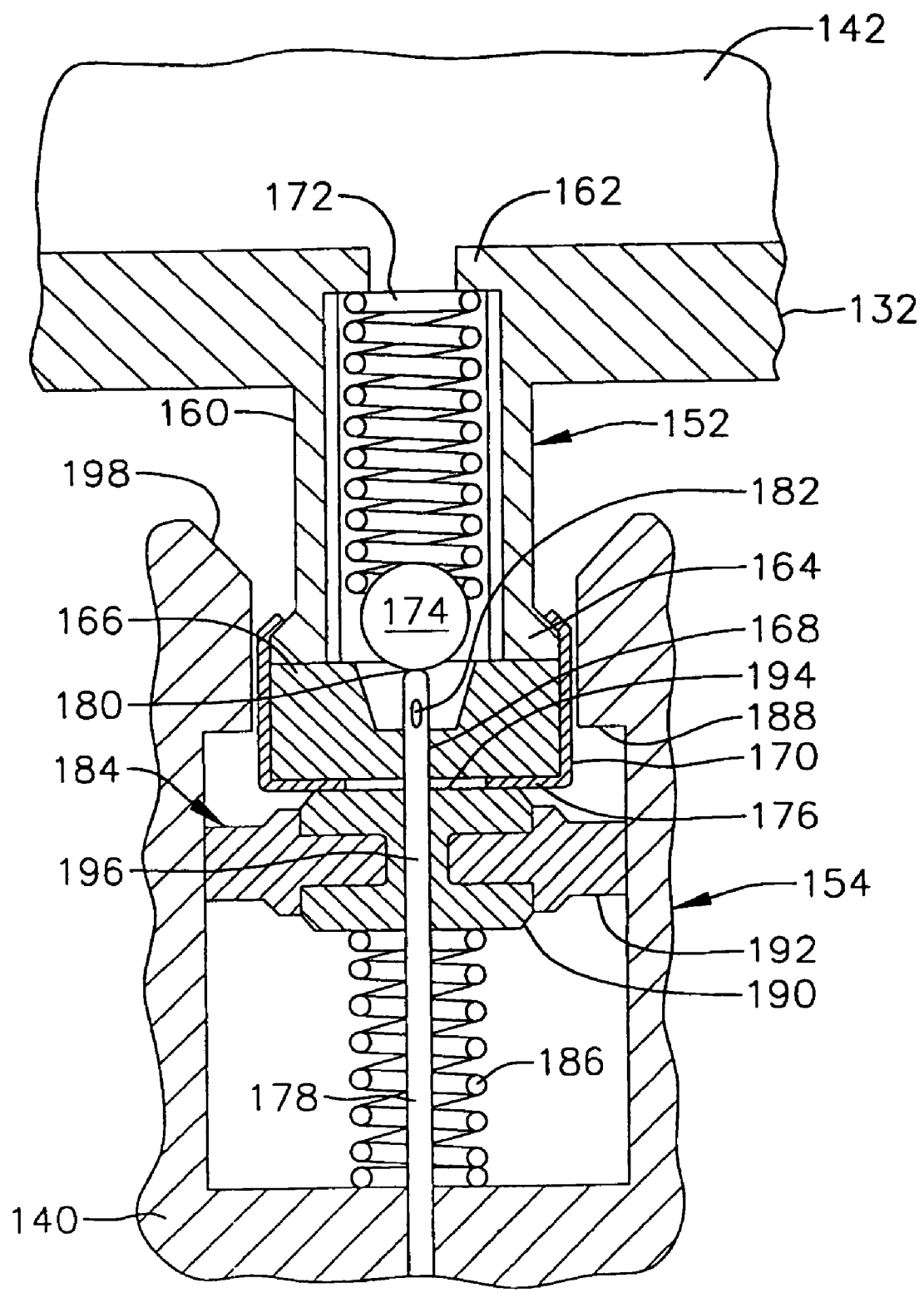
FIG. 5 is a section view of the connector arrangement illustrated in FIG. 4 in a connected state.

One example of a self-sealing fuel inlet/outlet connector arrangement that may be used in conjunction with the present inventions is illustrated in FIGS. 4 and 5. The exemplary fuel outlet 152 includes a hollow cylindrical boss 160 having a proximal end 162 that opens into the fuel reservoir 142. The distal end 164 includes a compliant septum 166 with a slit 168 that is secured by a crimp cap 170. A spring 172 (or other biasing device) and a sealing ball 174 are positioned between the compliant septum 166 and proximal end 162 of the hollow cylindrical boss 160. The length of the spring 172 is such that the spring biases the sealing ball 174 against the septum 166 to form a seal. The end 176 of the crimp cap 170 includes an opening that is aligned with the septum slit 168.

The fuel inlet 154 includes a needle 178 having a closed end 180, a lateral hole 182, and a bore that extends from the hole axially through the needle 178. A sliding collar 184, which surrounds the needle 178 and is biased by a spring 186 (or other biasing device) against an annular stop 188, includes a compliant sealing portion 190 and a substantially rigid retaining portion 192. The compliant sealing portion 190 includes an exposed upper surface 194 and an inner surface 196 in contact with the needle 178. In the disconnected position illustrated in FIG. 4, the hole 182 is surrounded and sealed by the sealing portion inner surface 196. The fuel inlet 154 is also preferably provided with a tapered lead-in portion 198 that guides and centers the fuel outlet 152 as it moves into the connected position illustrated in FIG. 5.

When the fuel outlet 152 is inserted into the fuel inlet 154 (FIG. 5) in order to establish a connection between the fuel cell stack 130 and the cartridge fuel reservoir 142, the blunt end 180 of the needle 178 will pass through the septum slit 168. The septum 166 should, therefore, be compliant enough to allow the needle 178 to be inserted without large insertion forces, yet stiff enough to provide a tight seal when the needle is removed. As the needle 178 passes through the septum 166 into the cylindrical boss 160, the sliding collar 184 and sealing ball 174 will be urged in opposite directions until the hole 182 is exposed. This establishes fluid communication between the fuel reservoir 142 and the stack 128 by way of the manifold.

The bi-product inlet/outlet connector arrangement is preferably the same as that illustrated in FIGS. 4 and 5. Additional details concerning the exemplary connector arrangement illustrated in FIGS. 4 and 5 may be found in U.S. Pat. No. 6,015,209, which is assigned to the Hewlett-Packard Company and incorporated herein by reference.

Figure 2:
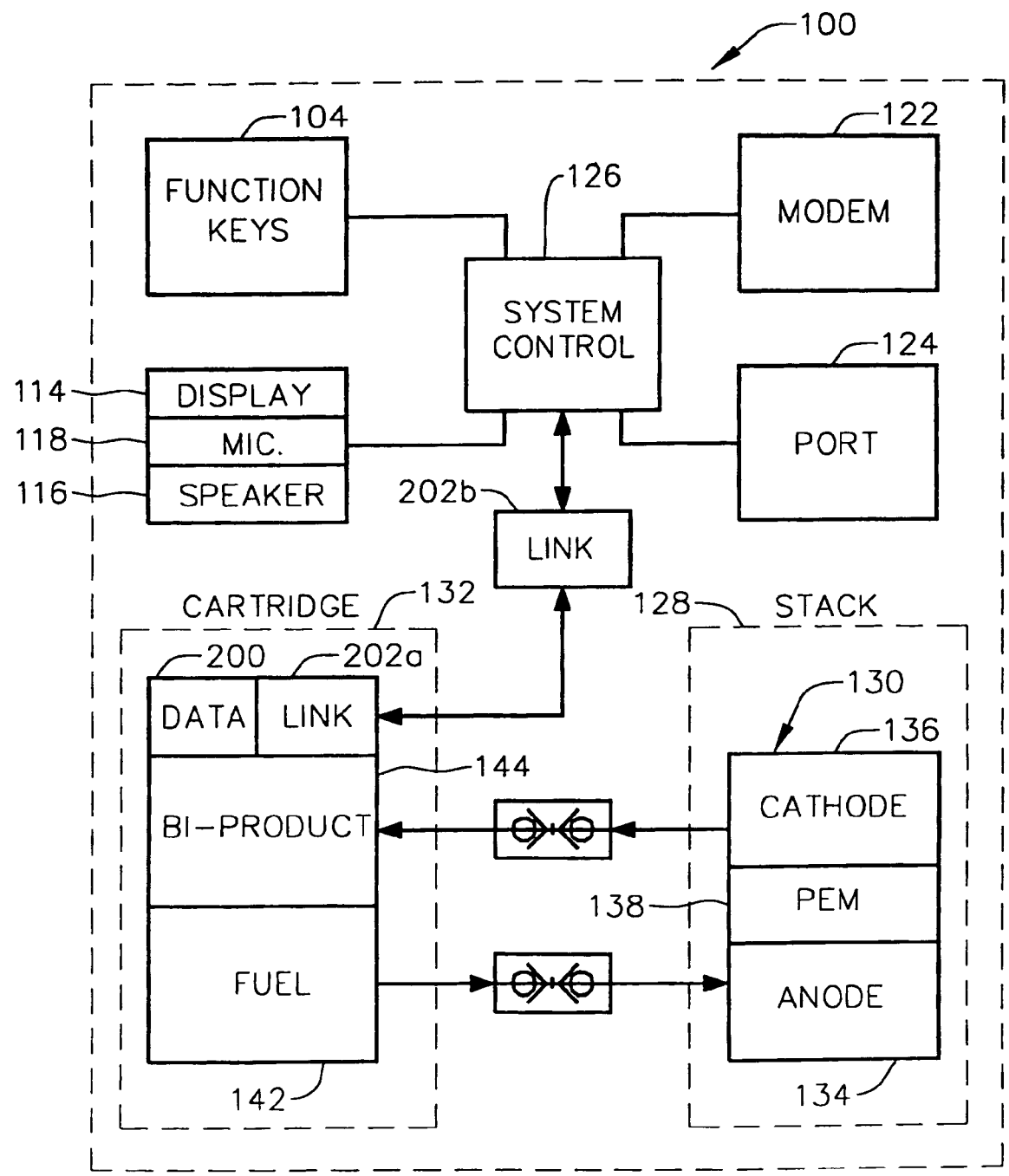
FIG. 2 is a schematic block diagram of the portable electronic device illustrated in FIG. 1.

As illustrated for example in FIGS. 2 and 3, the exemplary removable fuel cartridge 132 is also provided with an information storage device 200 that may be connected to the system controller 126 of the exemplary PDA 100 (or other host device) by way of a links 202a and 202b. Also, as discussed in detail below with reference to FIG. 12, the information storage device 200 may instead be provided in a self-contained removable fuel cell device that includes both fuel and one or more cells.

The present inventions are not limited to any particular information storage devices or links. However, in the illustrated embodiments, the information storage device 200 is an electrical storage device, such as a non-volatile serial EEPROM memory chip, whose data fields may be used in the manner described in detail below. Other exemplary memory devices include flash memory. The links 202a and 202b are preferably suitable contact-type electrical connectors such as pad/socket arrangements, pad/finger arrangements, pad/spring arrangements, pin/socket arrangements and conventional connectors. Non-contact links, such as capacitive coupling links, inductive coupling links, and RF links, may also be employed. Two way communication between the information storage device 200 and the system controller 126 will preferably be established by the links 202a and 202b when the fuel cartridge is received by the host device and connected to the fuel cell stack 128.

The location of the link 202a is not limited to any particular portion of the fuel cartridge 132. Rather, the link 202a may be located at the most appropriate location for a particular application, be it the top, bottom or sides of the exterior surface of the fuel cell cartridge 132 and, in the case of non-contact links, anywhere within the interior of the fuel cell cartridge if desired. The information storage device 200 is preferably located within the fuel cartridge housing.

A wide variety of data may be stored on, written to, and read from the fuel cartridge information storage device 200, both by the exemplary PDA 100 or other host device, or by some other device before or after the fuel cartridge has been used. Although the present inventions are not limited to any particular types of data or methods of utilization, various exemplary types of data and exemplary methods of utilization are discussed below in the order that they could be utilized during the life of an fuel cartridge.

Figure 6:
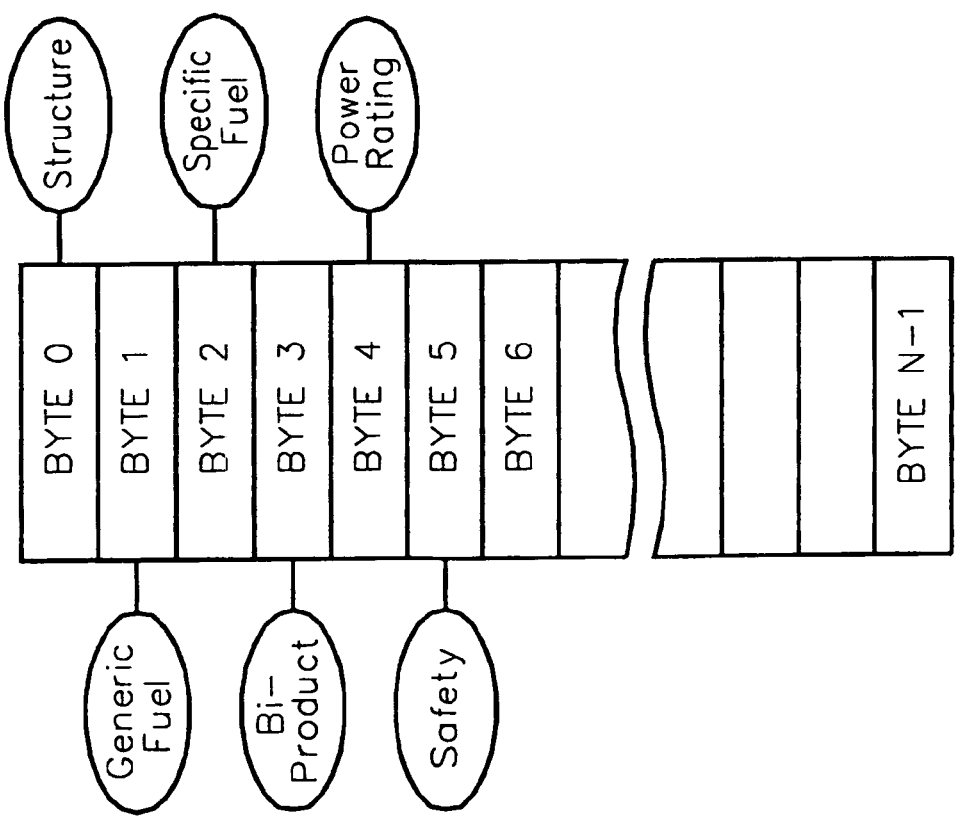
FIG. 6 is a schematic representation of the data structure of an information storage device in accordance with a preferred embodiment of a present invention.

One type of data stored by the information storage device 200, which is referred to herein as header information, preferably includes a parameter indicative of a certain type of information storage device data structure and certain keying information. A parameter indicative of data structure would not be necessary when the data structure is predetermined and will not change regardless of the host device with which it is used or the functions performed by the host device. With respect to the exemplary data structure illustrated in FIG. 6, the exemplary information storage device 200 is an 8 bit by N memory where N represents the memory size. Each individually addressable 8 bit memory location may be represented by an address value from 0 to N−1. The data structure information provides the addresses of the various types of data within the information storage device 200. Different data types may occupy a portion of an 8 bit memory location, an entire 8 bit memory location, or more than one 8 bit memory location. The data may also be stored in either a fixed or flexible format.

Turning to the keying information, this information is preferably composed of data fields that are used by the PDA 100 or other host device to accept or reject the fuel cartridge 132 based on, for example, system requirements and/or safety regulations. The keying data fields in the exemplary embodiment include, but are not limited to, generic fuel type (e.g. direct alcohol, alkaline, solid oxide, etc.), specific fuel type (e.g. grade, etc.), the bi-product, the maximum power rating, and safety information (e.g. whether the cartridge is suitable for use on an airplane). Other types of keying data may include manufacturer name and product ID numbers. Of course, the header information can be stored at any address or location on the information storage device 200, not just within the first few bytes as shown for exemplary purposes only.

Figure 7:
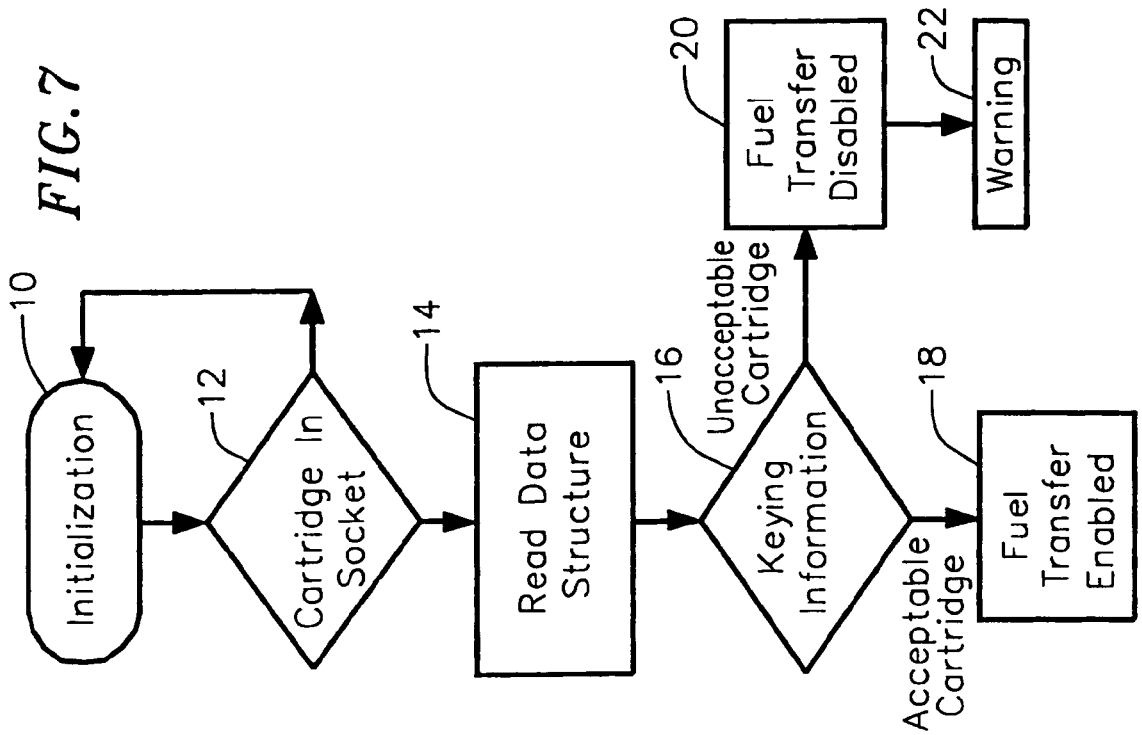
FIG. 7 is a flow chart in accordance with a preferred embodiment of a present invention.

As illustrated for example in FIG. 7, the header information stored by the information storage device 200 will be accessed by the system controller 126 after the exemplary PDA 100 or other host device has been initialized (e.g. powered up or reset) (Step 10) with a fuel cartridge 132 present within the fuel cell housing socket 146 (Step 12). The data structure parameter, if present, will typically be accessed (Step 14) prior to the keying information (Step 16). In those instances where the keying information stored on the information storage device 200 indicates that the fuel cartridge 132 corresponds to the requirements of the host device, operation will be permitted (Step 18). If, on the other hand, the keying information indicates that the fuel cartridge is wholly unacceptable, fuel transfer/cell operation will be prevented (Step 20) and the user will receive an audible and/or visible message concerning the situation (Step 22). Preferably, information concerning suitable alternative fuel cartridges will also be presented on the display 114. In those instances where the keying information indicates that the fuel cartridge 132 is permissible, but less than optimal, some implementations of the inventions will provide an audible and/or visible message to that end and suggested alternative fuel cartridges.

Fuel management data may also be stored on the information storage device 200. In the exemplary implementation, the fuel management data includes the initial fuel level (i.e. total capacity) of the fuel cartridge 132, the current fuel level, and a low fuel warning threshold. The initial fuel level data should be write protected because it is a fixed amount. The current fuel level data in one exemplary embodiment, on the other hand, is preferably defined by a decrementable data field that is originally equal to the initial fuel level. The current fuel level data field preferably consists of two 8 bit memory locations. The 8 bits in the first location are write once bits that each represent ⅛ of the initial fuel level, while the 8 bits in the second location are write many times bits that together represent one of the bits in the first location. The warning threshold should be based on a fuel level that will allow operation for a period sufficient to replace the fuel cartridge 132.

Figure 8:
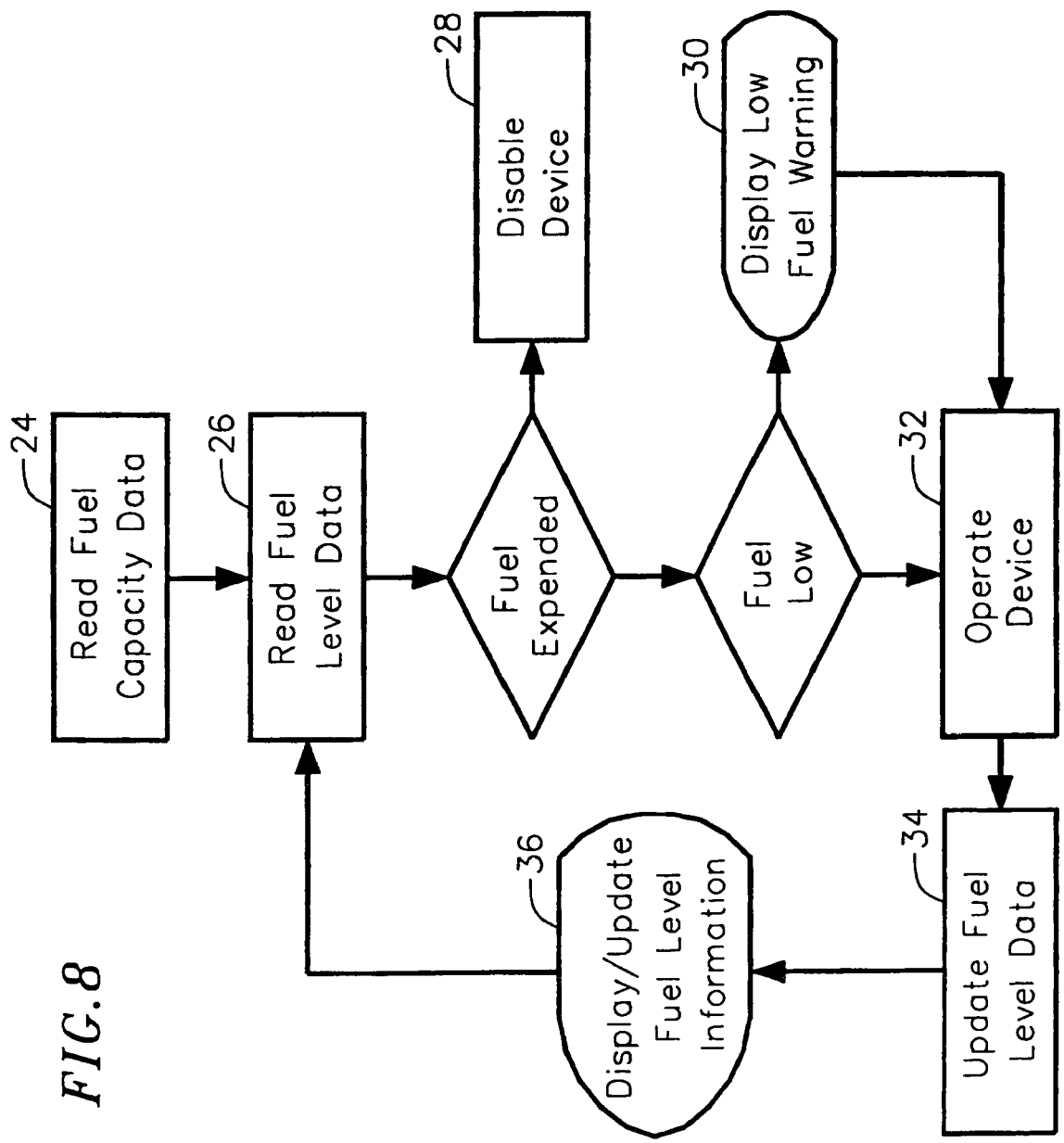
FIG. 8 is a flow chart in accordance with a preferred embodiment of a present invention.

The fuel management data may be used by the system controller 126 of the PDA 100 or other host device in the manner illustrated in FIG. 8. The initial fuel level data is read by the system controller 126 at the beginning of the fuel management process (Step 24) to calibrate the system and determine how much power is available (in amp-hours) given the type and amount of fuel. Next, the current fuel level is read (Step 26). If the current fuel level is zero, then the PDA 100 or other host device will be disabled (Step 28). If the current fuel level is greater than zero, but at or below the low fuel warning threshold, then the low fuel warning 206 will be displayed on the display 114 in, for example, the manner discussed below with reference to FIG. 9 (Step 30) while the device continues to operate (step 32). The current data field is updated by the system controller 126 (Step 34) as the PDA 100 or other host device operates. More specifically, current and/or power drawn from the stack 128 is monitored and used to calculate the amount of fuel that is being consumed in terms of amp-hours. The calculated amount of consumed fuel is decremented from the current fuel level data field by the system controller 126 and the revised fuel level is displayed (or updated if it is already being displayed) on the display 114 (Step 36).

Figure 9:
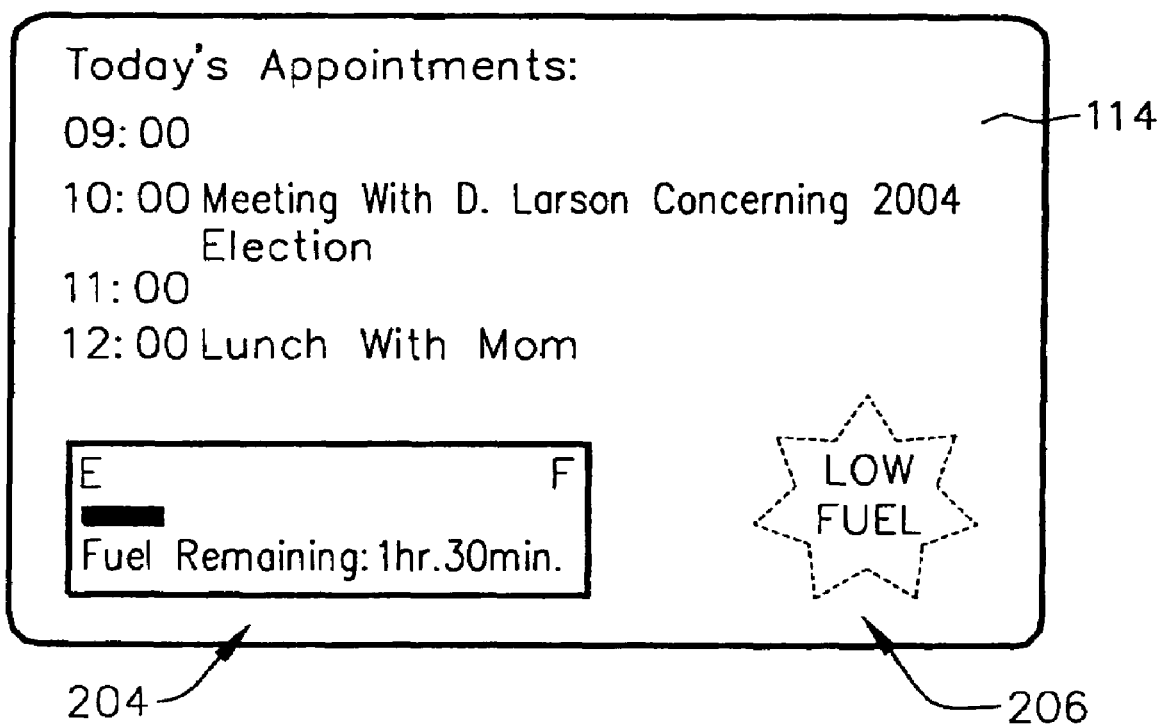
FIG. 9 is a plan view of a display in accordance with a preferred embodiment of a present invention.

As illustrated for example in FIG. 9, a fuel gauge 204 may be provided on the display 114 of the exemplary PDA 100 or other host device. The fuel gauge 204 is updated by the system controller 126 as the current fuel level data is updated. The amount of fuel remaining within the fuel cartridge 132 is preferably, although not necessarily, expressed both numerically (in terms of hours and minutes of remaining use) and graphically with a bar or other suitable graphic/pictorial expression. With respect to the low fuel warning, the exemplary PDA 100 also displays a warning symbol 206 on the display 114 when the volume of fuel within cartridge 132 drops below the predetermined threshold level. Of course, other methods of communicating this information to the user such as, for example, audible alarms, flashing lights, vibrations, and recorded messages, may also be employed.

Given that the exemplary information storage device 200 is a non-volatile device, the current fuel level data will remain with the fuel cartridge 132 should it be removed from the PDA 100 or other host device. Accordingly, when the fuel cartridge 132 moved from one host device to another, the new host device will be able to read the initial and current fuel level data to determine how much fuel is within the fuel cartridge and, for that particular host device, the corresponding number hours and/or minutes of use that remain.

It is also anticipated that once all of the fuel has been consumed, the fuel cartridge 132 will be returned to the manufacturer for recycling or disposal. Cartridges that fail during use would also be returned. Accordingly, non-operational data such as marketing and maintenance information may also be stored on the information storage device 200 for review by the manufacturer or other entity. In contrast to operational data, which is used to affect current operations of the host such as real time information display, power consumption, and the acceptance/rejection of a particular fuel cell apparatus, non-operational data is typically used later. Non-operational data could be used to design improved fuel cartridges, fuel cartridges that are better suited for specific applications, and improved host devices.

As illustrated for example in FIG. 10, after the fuel cartridge 132 has been received (Step 38) and the PDA 100 or other host device has begun to operate (Step 40), non-operational data may be incrementally written to the information storage device 200 by the system controller 126 (Steps 42 and 44). Alternatively, the data may be stored in the memory of the system controller 126 and written to the information storage device 200 upon a predetermined event, such as just prior to the fuel being completely consumed, or at a predetermined point during normal operations, such as each start-up or shut down of the host device.

With respect to marketing information, the non-operational data will preferably include data that is indicative of how the PDA 100 or other host device was used while being powered by the fuel cartridge 132. For example, data that is related to the fuel cell and fuel cartridge, such as how often the host device is turned on and how long it remains on, may be stored on the information storage device 200. Such information may be used to fine tune the energy capacity of future fuel cells and determine whether the low fuel threshold is properly set. Data that is unrelated to the fuel cell and fuel cartridge may also be stored. This data, which may include the number of times particular features of the host device are utilized, will provide designers of host devices who retrieve the recorded data with important information that may be used when designing new products (Step 46).

Turning to maintenance information, failure modes are one example of the non-operational maintenance related data that may be stored on the information storage device 200 and used by the designers of host devices, fuel cells and fuel cell cartridges when designing new products. Data that is indicative of how many cartridges are installed prior to the failure of the link 202b, for example, could be used to determine whether a particular link was suitable for the host device that was powered by the fuel cartridge (Step 46).

Data stored on the information storage device 200 may also be used by the system controller 126 in the PDA 100 or other host device to trigger various functions performed by the host device in, for example, the manner illustrated in FIG. 11 after the host device has been initialized and the data structure parameter, if present, read (Steps 48 and 50). The trigger data may include data that is accessed prior to the onset of normal host device operations. For example, portions of the aforementioned keying data, such as the generic fuel type, specific fuel type or power rating, may be accessed prior to the onset of normal host device operations (Step 52). Normal operations will proceed if the keying data does not trigger a specified function (Steps 54 and 56). If, however, the keying data triggers a host device function, that function will be initiated either prior to, concurrent with, or shortly after the onset of normal operation (Step 58). The triggered host device function may, for example, be increasing or decreasing a power consumption or power management factor in response to the stored fuel related keying data.

Other types of trigger data stored on the information storage device 200, and the corresponding triggered function performed by the PDA 100 or other host device, will typically be utilized after the onset of normal operations (Step 60). The host device will read the trigger data from the information storage device 200, determine whether it is actionable and, if actionable, respond with the appropriate function. Such trigger data could, for example, be indicative of new/related product and services offerings, software/hardware upgrades or other related product/marketing information. The trigger data could also be indicative of advertising or other marketing materials that is unrelated to the host device.

A software upgrade will be use herein for illustrative purposes only. When the data stored in the information storage device 200 indicates that a software upgrade is available for the exemplary PDA 100 or other host device, an appropriate message will appear on the display 114. Such a message may include the title of the software program and information about the upgrade. In one implementation, the displayed message concerning the exemplary software upgrade could also include an invitation to "click" a displayed icon that will cause the host device to connect to the manufacturer's web site so that the upgrade may purchased and/or downloaded.

The trigger data may also include instructions concerning future triggers related to the software upgrade. More particularly, the instructions could allow the upgrade information to appear each time the host device is initialized until the user either obtains the upgrade or indicates a lack of interest. The instructions could, alternatively, cause the trigger data to be erased from the information storage device 200 after a predetermined number of triggers based upon that particular data.

Trigger data accessed during normal operations may also include fuel management data, such as the current fuel level data, that is stored on the information storage device 200. The function triggered in host device may be to increase or decrease a power consumption or power management factor in response to the stored data, as noted above. The PDA 100 or other host device could also provide a reorder number on the display 114, automatically order additional fuel cartridges without user interaction, or include an invitation to "click" a displayed icon that will cause the host device to connect to the manufacturer's web site so that a fuel cartridge may be ordered by the user.

Figure 12:
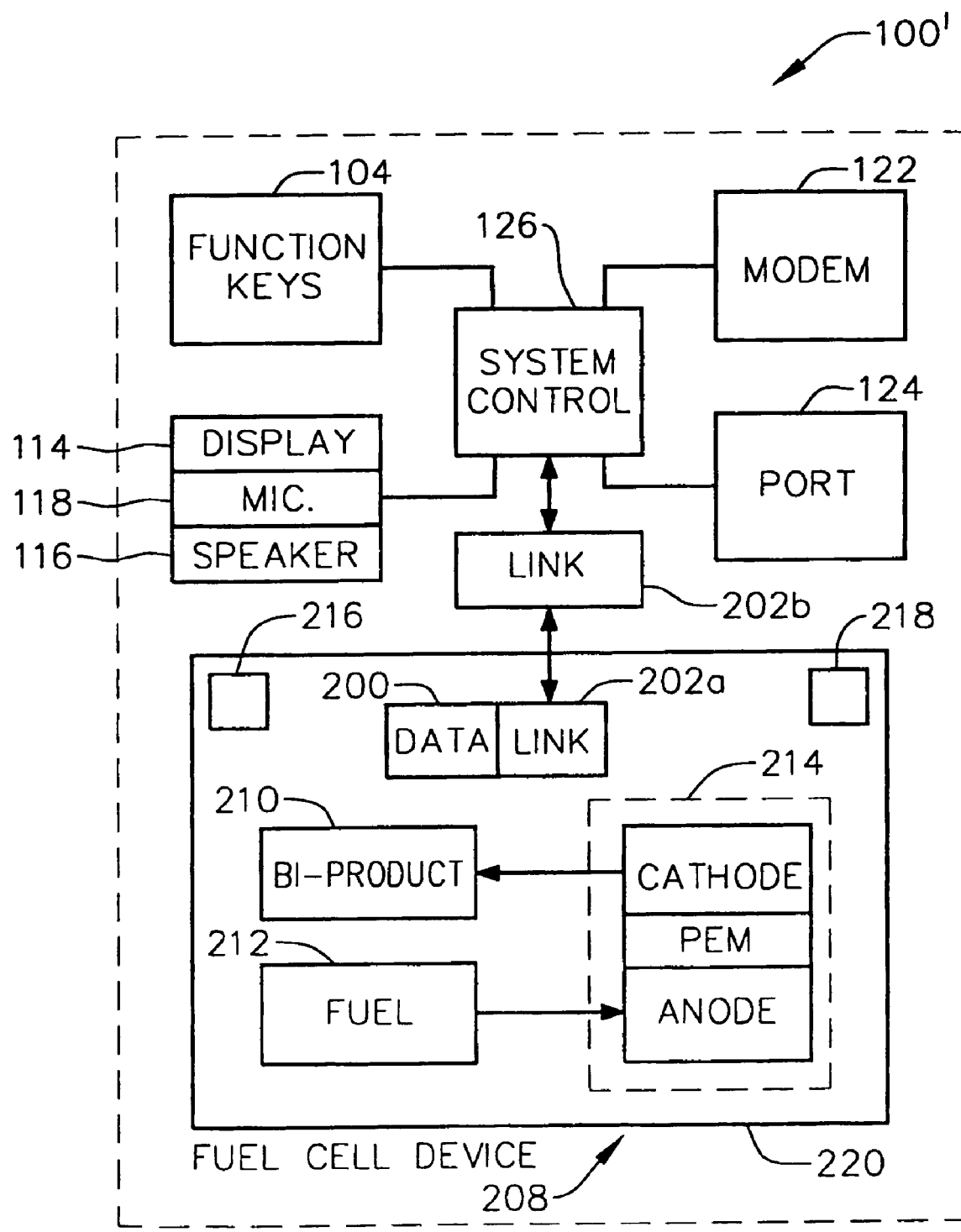
FIG. 12 is a schematic block diagram of a portable electronic device in accordance with a preferred embodiment of a present invention.

It should also be noted that the inventions herein are applicable to removable, self-contained fuel cell devices that may be inserted into a host device. Referring to FIG. 12, a self-contained fuel cell device 208 in accordance with one embodiment of a present invention may be inserted into a PDA 100' is essentially identical to the PDA 100, but for the fact that PDA 100' receives a self-contained fuel cell device instead of the fuel cartridge 132, and like elements are represented by like reference numbers. In addition to the information storage device 200 which functions in the manner described above, the exemplary fuel cell device 208 includes separate fuel and bi-product reservoirs 210 and 212 and a PEM fuel cell stack 214. Power generated by the stack 214 is transferred to the PDA 100' by electrical power contacts 216 and 218 which mate with corresponding contacts (not shown) within the PDA. Each of these elements is mounted on or within a housing 220.

The size of a self-contained fuel cell device 208 would, of course, vary in accordance with factors such as the size of the host device and the desired amount of fuel. Although the present inventions are not limited to any particular size, the exemplary fuel cartridge 208, which is suitable for use in a PDA, is about 1 cm×2 cm×4 cm and carries about 6 ml of fuel. It is contemplated that, depending on the application, the size of the device may be varied to accommodate from 1 ml or less to 1 L or more of fuel. Of course, these volumes may be increased or decreased as needed.

Although the present inventions have been described in terms of the preferred embodiments above, numerous modifications and/or additions to the above-described preferred embodiments would be readily apparent to one skilled in the art. By way of example, but not limitation, a fuel cell apparatus in accordance with a present invention could include its own processor (or other information processing instrumentalities) to take some of the processing load off of the host device. It is intended that the scope of the present inventions extend to all such modifications and/or additions.

The invention claimed is:

1. A replaceable fuel cartridge for use with a host device including a processor, a processor link and at least one fuel cell, the fuel cartridge comprising:
   a cartridge housing;
   a fuel reservoir within the cartridge housing;
   a connector that connects the fuel reservoir to the at least one fuel cell when the fuel cartridge is received by the host device;
   an information storage device carried by the housing; and
   an information storage device link, operably connected to the information storage device and carried by the housing, configured to operably connect the information storage device to the processor link when the fuel cartridge is received by the host device.

2. A replaceable fuel cartridge as claimed in claim 1, further comprising:
   a bi-product reservoir within the cartridge housing; and
   a connector that connects the bi-product reservoir to the at least one fuel cell when the fuel cartridge is received by the host device.

3. A replaceable fuel cartridge as claimed in claim 1, wherein the information storage device link comprises an electrical connector.

4. A replaceable fuel cartridge as claimed in claim 1, wherein the information storage device link comprises a non-contact link.

5. A replaceable fuel cartridge as claimed in claim 1, wherein the information storage device comprises non-volatile memory.

6. A replaceable fuel cartridge as claimed in claim 1, wherein the information storage device defines a data structure and stores data indicative of the data structure.

7. A replaceable fuel cartridge as claimed in claim 1, wherein the information storage device stores data that is used by the host device to determine whether the fuel cartridge is acceptable for use with the host device.

8. A replaceable fuel cartridge as claimed in claim 1, wherein the information storage device stores data that represents at least one of an initial fuel level, a current fuel level, and a low fuel warning threshold.

9. A replaceable fuel cartridge as claimed in claim 1, wherein the information storage device stores data that represents current fuel level in a decrementable data field.

10. A replaceable fuel cartridge as claimed in claim 1, wherein the information storage device stores data that represents non-operative information.

11. A replaceable fuel cartridge as claimed in claim 1, wherein the information storage device stores data that will trigger a predetermined host device function.

12. A replaceable fuel cartridge as claimed in claim 11, wherein the host device includes a display and the predetermined host function comprises a displaying a message on the display corresponding to data stored in the information storage device.

13. A replaceable fuel cartridge as claimed in claim 1, wherein the at least one fuel cell comprises a plurality of fuel cells; and the connector connects the fuel reservoir to the plurality of fuel cells when the fuel cartridge is received by the host device.

14. A replaceable fuel cartridge as claimed in claim 1, wherein the at least one fuel cell comprises a fuel cell stack including a plurality of fuel cells; and the connector connects the fuel reservoir to the fuel cell stack when the fuel cartridge is received by the host device.

* * * * *

UNITED STATES PATENT AND TRADEMARK OFFICE
CERTIFICATE OF CORRECTION

PATENT NO. : 7,306,863 B2 Page 1 of 1
APPLICATION NO. : 10/957468
DATED : December 11, 2007
INVENTOR(S) : Michael L. Bullock et al.

It is certified that error appears in the above-identified patent and that said Letters Patent is hereby corrected as shown below:

In column 11, line 16, in Claim 12, after "comprises" delete "a".

Signed and Sealed this

Seventh Day of April, 2009

JOHN DOLL
*Acting Director of the United States Patent and Trademark Office*